(12) United States Patent
Manghirmalani et al.

(10) Patent No.: US 9,503,311 B2
(45) Date of Patent: Nov. 22, 2016

(54) METHOD AND APPARATUS FOR PROVIDING NETWORK APPLICATIONS MONITORING

(71) Applicant: TELEFONAKTIEBOLAGET L M ERICSSON (PUBL), Stockholm (SE)

(72) Inventors: Ravi Manghirmalani, Fremot, CA (US); Ramesh Mishra, San Jose, CA (US); Ramesh Subrahmaniam, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 13/890,633

(22) Filed: May 9, 2013

(65) Prior Publication Data

US 2014/0337508 A1    Nov. 13, 2014

(51) Int. Cl.
    *G06F 15/173* (2006.01)
    *H04L 12/24* (2006.01)
    *H04L 12/26* (2006.01)

(52) U.S. Cl.
    CPC .............. *H04L 41/04* (2013.01); *H04L 41/12* (2013.01); *H04L 43/028* (2013.01); *H04L 43/0894* (2013.01)

(58) Field of Classification Search
    CPC ................................................. H04L 43/0894
    USPC ......................................................... 709/224
    See application file for complete search history.

(56) References Cited

U.S. PATENT DOCUMENTS

| | | | |
|---|---|---|---|
| 8,284,664 B1 | 10/2012 | Aybay et al. | |
| 8,438,654 B1 | 5/2013 | von Eicken et al. | |
| 8,805,921 B2 | 8/2014 | Deng et al. | |
| 9,183,031 B2 | 11/2015 | Spiers | |
| 2004/0064293 A1 | 4/2004 | Hamilton | |
| 2004/0088405 A1 | 5/2004 | Aggarwal | |
| 2007/0186011 A1* | 8/2007 | Batke et al. | 709/246 |
| 2008/0098454 A1 | 4/2008 | Toh | |
| 2009/0094364 A1 | 4/2009 | Stevens et al. | |

(Continued)

FOREIGN PATENT DOCUMENTS

| | | |
|---|---|---|
| EP | 0918412 A2 | 5/1999 |
| EP | 2 150 067 A1 | 2/2010 |
| EP | 2 518 937 A2 | 10/2012 |

OTHER PUBLICATIONS

Mastelic et al; M4Cloud—Generic Application Level Monitoring for Resource-Shared Cloud Environments; Apr. 18, 2012; all pages.*

(Continued)

*Primary Examiner* — Glenford Madamba

(57) ABSTRACT

A method and apparatus for providing network performance monitoring using a switch running a service monitoring (SERMON) client is disclosed. A request for SERMON metrics is received from a performance database manager (PDM). The request is sent to the SERMON server designated in the request. The SERMON server is running in a service host. A reply is received from the SERMON server. The reply is sent to the PDM.

A method and apparatus for providing network performance monitoring using a service host running a service monitoring (SERMON) server is disclosed. In one embodiment, a request is received from a SERMON client. SERMON data is collected using a kernel thread. The collected data is sent in a reply to the SERMON client.

6 Claims, 17 Drawing Sheets

(56) References Cited

U.S. PATENT DOCUMENTS

| | | |
|---|---|---|
| 2010/0064357 A1 | 3/2010 | Baird et al. |
| 2010/0287019 A1 | 11/2010 | Guo et al. |
| 2010/0303083 A1 | 12/2010 | Belanger et al. |
| 2011/0055817 A1 | 3/2011 | Noble et al. |
| 2011/0078303 A1 | 3/2011 | Li et al. |
| 2011/0307889 A1* | 12/2011 | Moriki ............... G06F 9/45558 718/1 |
| 2012/0281540 A1 | 11/2012 | Khan et al. |
| 2012/0290460 A1 | 11/2012 | Curry |
| 2012/0311157 A1 | 12/2012 | Erickson et al. |
| 2013/0272305 A1 | 10/2013 | Lefebvre |
| 2013/0275596 A1 | 10/2013 | Subramaniam |
| 2014/0236745 A1 | 8/2014 | Vautour |
| 2014/0337507 A1 | 11/2014 | Manghirmalani |
| 2014/0337509 A1 | 11/2014 | Manghirmalani |
| 2014/0344439 A1 | 11/2014 | Kempf |
| 2015/0317169 A1 | 11/2015 | Sinha |

OTHER PUBLICATIONS

Bovet et al; Understanding the LINUX Kernel; Jan. 2006; all pages.*

LineRate et al; Key Issues to Consider for Software Network Function Virtualization {NFV}—Software Architecture, Performance, Reliability & Orchestration; p. 1.*

Mastelic T. et al., "M4Cloud—Generic Application Level Monitoring for Resource-Shared Cloud Environments", CLOSER 2012, 2nd International Conference on Cloud Computing and Services Science, Apr. 18, 2012, P055129872, Porto, Portugal, Retrieved from the Internet: URL:https://www.infosys.tuwien.ac.at/staff/ivona/papers/M4Cloud.pdf [retrieved on Jul. 17, 2014] Sec. 3 Sec. 3.1, Sec. 4-Sec. 5, figures 2, 3, 6, 7, 8.

Morgan R. et al., "Home-Sigar-Hyperic Support", Dec. 20, 2010, XP055130049, Retrieved from the Internet: URL:https://support.hyperic.com/display/SIGAR/Home [retrieved on Jul. 18, 2014], p. 1-p. 2.

Bovet D. et al., "Kernel Threads", In: "Kernel Threads", Jan. 1, 2006, XP055130069, ISBN: 978-0-59-600565-8, pp. 123-126, p. 123-p. 126.

"www.citrix.com/products/netscaler-application-delivery-controller/overview.html", Retrieved from internet on Jun. 14, 2013.

"Network Function Virtualization; Management and Orchestration", 11, ETSI Standards, May 6, 2013, XP14152881, France, the whole document.

"Key Issues to Consider for Software Network Function Virtualization (NFV)—Software Architecture, Performance, Reliability & Orchestration", ETSI Standards, Jan. 15, 2013, XP14093911, France, the whole document.

"Resource Management with VMware DRS, VMware Infrastructure", Revision Nov. 22, 2006 Version: 1.1, pp. 1-24.

"VMware Distributed Resource Scheduler (DRS)", Dynamic Load Balancing and Resource Allocation for Virtual Machines, pp. 1-3.

"DRS Performance and Best Practices", VMware Infrastructure 3, pp. 1-19.

Jin H. et al. "Dynamic Processor Resource Configuration in Virtualized Environments", Huazhong University of Science and Technology, Wuhan, China, pp. 1-8.

Zhao, W. et al. "Dynamic Memory Balancing for Virtual Machines", Mar. 11-13, 2009, pp. 1-10.

Pepelnjak, Ivan; Openflow 1.1 in Hardware: I Was Wrong (Again); http://blog.ioshints.info/2011/04/openflow-11-in-hardware-i-was-wrong.html; retrieved on Apr. 16, 2013.

* cited by examiner

| Number of Counter Objects | |
|---|---|
| Command (Fetch)/ Status (Done) | |
| Counter Object & Size | Counter Name |
| | Error Code |
| | Counter Value |
| ... | ... |
| Counter Object & Size | Counter Name |
| | Error Code |
| | Counter Value |

Figure 11

METHOD AND APPARATUS FOR PROVIDING NETWORK APPLICATIONS MONITORING

FIELD

The present disclosure relates to frameworks for virtualized and non-virtualized environments. More particularly, the present disclosure relates to frameworks for providing performance monitoring.

BACKGROUND

Many telecom-oriented services are being considered for deployment within the confines of data-centers. These services have a large compute bias and lax latency requirements. Current data-centric deployments involve a large number of machines on the order of hundreds of thousands in both virtual as well as non-virtual environments.

A Distributed Resource Scheduler (DRS) is a technology that is used to optimize computing resources to align with business needs and priorities. The DRS can operate in a manual mode or an automatic mode. In an automatic mode the DRS determines the best possible distribution of virtual machines, taking into account the business policies, and relocates the virtual machines to the appropriate physical servers. In a manual mode the DRS makes recommendations that align with business policies. The DRS runs in the context of a virtual center (vCenter) and assists the resource allocation function.

A Vscheduler is another framework for managing processor resources. Its local and global resource configuration framework allows virtual machines (VMs) to be balanced for processing resources locally and globally across a cluster. The Vscheduler uses a centralized manager node that receives input from VMAgents in VMs and PMAgents in physical nodes.

The Memory Balancer (MEMB) dynamically monitors the memory usage of each VM in a virtual environment, predicts the memory needs of each VM based on swap space usage and a least recently used (LRU) histogram to track physical addresses, and periodically reallocates host memory to the VMs needing more memory resources.

Frameworks such as the ones mentioned above provide a centralized mechanism to optimize the cluster/host resources like CPU, Memory, Storage, and Power across a plurality of machines.

These aforementioned frameworks provide tools to optimize the host and cluster wide resources like CPU and memory. Given the importance of connectivity in a data center there is a dearth of frameworks that optimize the performance of a network or a connection fabric.

Application performance metrics like the number of open sockets and the working set size for example, require the cooperation of the Guest Operating System (OS), running in the guest domain (Domain U) on top of which the application is running.

What is needed, therefore, is a framework for exporting application configuration and performance information for performance monitoring in virtualized and non-virtualized environments.

SUMMARY

A method for providing network performance monitoring using a switch running a service monitoring (SERMON) client is disclosed. A request for SERMON metrics is received from a performance database manager (PDM). The request is sent to the SERMON server designated in the request. The SERMON server is running in a service host. A reply is received from the SERMON server. The reply is sent to the PDM.

The SERMON client running in the switch can register with a network controller on bootup using an identifier. The SERMON client can notify a controller of the service host and applications hosted on the service host using an identifier.

A communications (COM) server of the SERMON client parses the request and sends the request to a Service Data Collector Unit (SDCU) of the SERMON client. Sending the request to the SERMON server can include retrieving, using the SDCU, the service host to which to send the request. For each request sent to each service host, the SDCU: formulates a command and an expected data type; encapsulates the request in a designated tag; sends the encapsulated request to a switch datapath; and waits for a reply from the service host. In one embodiment, receiving the reply from the SERMON server includes the SDCU receiving the reply and sending the reply to the COM server. In one embodiment, the COM server sends the reply to the PDM.

An apparatus for providing network performance monitoring is disclosed. In one embodiment, the apparatus includes a switch having a service monitoring (SERMON) client. The SERMON client has a communications (COM) server and a Service Data Collector Unit (SDCU). The SERMON client is configured to: receive a request for SERMON metrics from a performance database manager (PDM); send the request to the SERMON server designated in the request, the SERMON server running in a service host; receive a reply from the SERMON server; and send the reply to the PDM.

A method for providing network performance monitoring using a service host running a service monitoring (SERMON) server is disclosed. In one embodiment, a request is received from a SERMON client. SERMON data is collected using a kernel thread. The collected data is sent in a reply to the SERMON client.

An apparatus for providing network performance monitoring is disclosed. In one embodiment, a service host has a service monitoring (SERMON) server. The SERMON server may include a Service Data Collector Unit (SDCU) and a kernel thread. The SERMON server is configured to: receive a request from a SERMON client; collect SERMON data using a kernel thread; and send the collected data in a reply to the SERMON client.

The received request can be an encapsulated, tagged frame. A Service Data Collector Unit of the SERMON server can decapsulate the tagged frame. The reply can be returned by the kernel thread as an encapsulated tagged frame.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 11 shows a request/response format for a counter, according to one embodiment.

DESCRIPTION OF EMBODIMENTS

Figure 1:
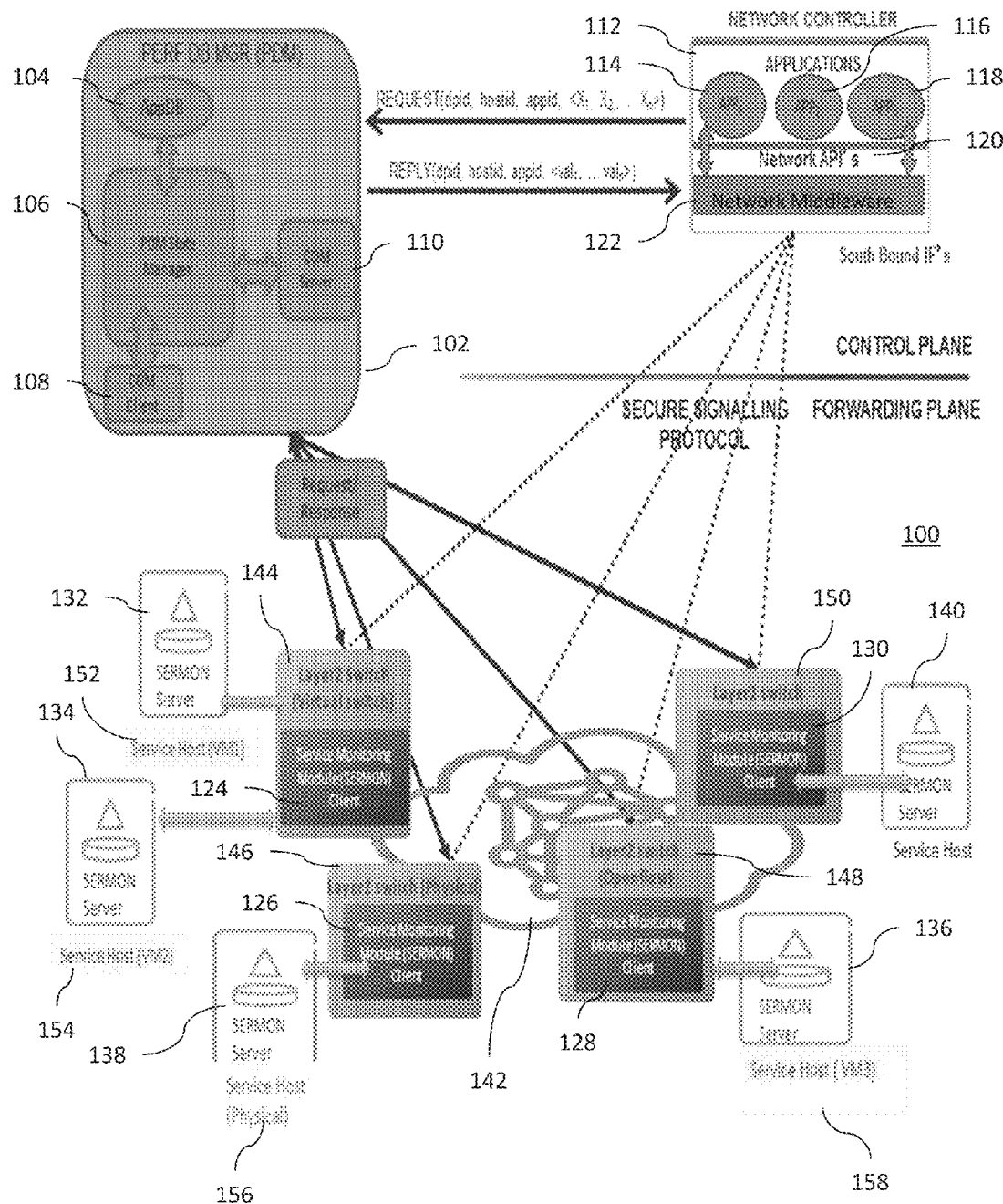
FIG. 1 illustrates a block diagram of a system for providing performance monitoring, according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, tablets, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

A seamless non-intrusive scalable framework that retrieves the network application performance metrics from a collection of applications running on machines is disclosed. The network application performance metrics can be easily exported to the centralized controller component in Software Defined Networks (SDNs).

The framework includes components and messaging that work coherently together to achieve the objective of presenting the network application running in the centralized controller with the performance data needed to make an intelligent decision for loading balancing network flows across several instances of a network appliance.

The use of such a framework can lead to supporting the deployment of cloud services with stringent service level agreements for network performance in even more dynamic service environments while making cost-effective use of network infrastructures without gross over-provisioning.

SDNs offer scope for a global view of the network including the topology and the metrics. It is possible to perform automatic load balancing and placement features based on metrics that can be obtained from the services in the network. In a services network there may be multiple instances of a particular service like Deep Packet Insertion (DPI) or a content filter running in a network. The present disclosure defines a framework for providing useful performance data of a hosted application.

FIG. 1 illustrates a block diagram of a system for providing performance monitoring, in accordance with one embodiment. As shown in FIG. 1, the framework, e.g., system 100, has a scalable performance data base manager (PDM) 102. The PDM 102 includes a database, e.g., AppDB 104, a PDM state manager 106, a Communications (COM) client 108, and a COM server 110. Database 104 includes information that is used, for example, by controller applications 114, 116, 118.

The PDM state manager 106 is responsible for managing all of the states for metrics that are periodically collected from one or more entities running in the context of the hosted service environment. The PDM state manager 106 stores these states in AppDB 104. The PDM state manager 106 is also responsible for formulating messages, e.g., from requests, received from a network controller 112 through COM server 110 and funneling these messages to the COM client 108.

As stated above, network controller 112 sends requests to PDM 102. Network controller 112 also runs network application programming interfaces (API's) 120 and network middleware 122. In one embodiment, the request may include a datapath identifier (DPID), a host identifier (HostID), and application identifier (AppID), and other data ($X_1$, $X_2$, ..., $X_n$). This other data can be the request for actual data items, e.g., number of open sockets, average load, etc.

Communications (COM) server module 110 services requests from applications 114, 116, 118 running on network controller 112. A COM client module 108 assists the PDM 102 with populating the database 104 by maintaining connections to each entity, e.g., the Service Monitoring (SERMON) client 124, 126, 128, 130, that services the requests. The SERMON client 124, 126, 128, 130 services the requests made by the COM client module 108. A SERMON server module 132, 134, 136, 138, 140 retrieves the requested information for an application 114, 116, 118 using an AppID.

The database 104 and its manager 102 can be co-located within the controller 112 or outside of it, depending on the specific configuration for communication between the controller 112 and the database manager 102. In FIG. 1, the network controller 112 and the PDM 102 are shown as different entities. The communication between them is shown to be generic and is not restricted to any message type. In one embodiment, a RESTful interface, i.e., corresponding to Representational State Transfer (REST) constraints, or any proprietary interface can be used as part of the implementation. Although some of the messages of the present disclosure are described as using a RESTful interface, as stated above, the present disclosure is not limited to RESTful interfaces.

The centralized PDM 102 is responsible for populating the information in the database 104, which depends on a schema that is given to the PDM 102 by the SDN application 114, 116, 118. The SDN application 114, 116, 118 is decoupled from the database 104 and is also not responsible for maintaining connections with each application agent. The application agent is a component that runs on top of the network controller and acts on behalf of an application. The application agent forms the actual requests to be sent and is also responsible for handling the responses for the requests. Further the COM client 108 in the PDM 102 module connects with each SERMON client 124, 126, 128, 130 that handles the database requests. SERMON client 124, 126, 128, 130 is running on a Layer 2 Switch 144, 146, 148, 150.

The Layer 2 Switch can be a virtual switch running in a hypervisor, a physical Ethernet switch, or an Openflow switch. The SERMON module running on the switch runs as a functional block that is responsible for encapsulating/decapsulating requests/responses to service hosts. The SERMON module can choose any of the following to make a request to the service hosts: dedicated management Virtual Local Area Network (VLAN) (Physical Ethernet); Multi-Protocol Label Switching (MPLS) tagged (Openflow); and/or a higher level Transmission Control Protocol (TCP) connection to the server. The switch datapath is programmed to forward these packets to the correct ports in order to reach the service hosts.

The SERMON client 124, 126, 128, 130 module then translates the database requests into the appropriate messages that are encapsulated in a specific VLAN tag, MPLS tag or a TCP session (at a specific TCP port). The SERMON server 132, 134, 136, 138, 140 module that runs in the context of the network application environment handles the SERMON client 124, 126, 128, 130 requests data and returns the requested data, e.g., in a response to PDM 102.

The present disclosure identifies the SERMON server 132, 134, 136, 138, 140 running in the network application environment, e.g., on a service host 152, 154, 156, 158, by a SERMON server ID (ServID). The SERMON client is identified with a specific SERMON client ID (CliID). The SERMON client 124, 126, 128, 130 sends a list of known SERMON Servers 132, 134, 136, 138, 140, identified by the ServID, to enable the PDM 102 to specify the exact entity that should be contacted for performance information, which is identified by SERMON CliID/SERMON ServID/AppID. The SERMON client 124, 126, 128, 130 is also responsible for encapsulation and decapsulation of the messages between the SERMON client 124, 126, 128, 130 and the SERMON server 132, 134, 136, 138, 140.

Figure 2:
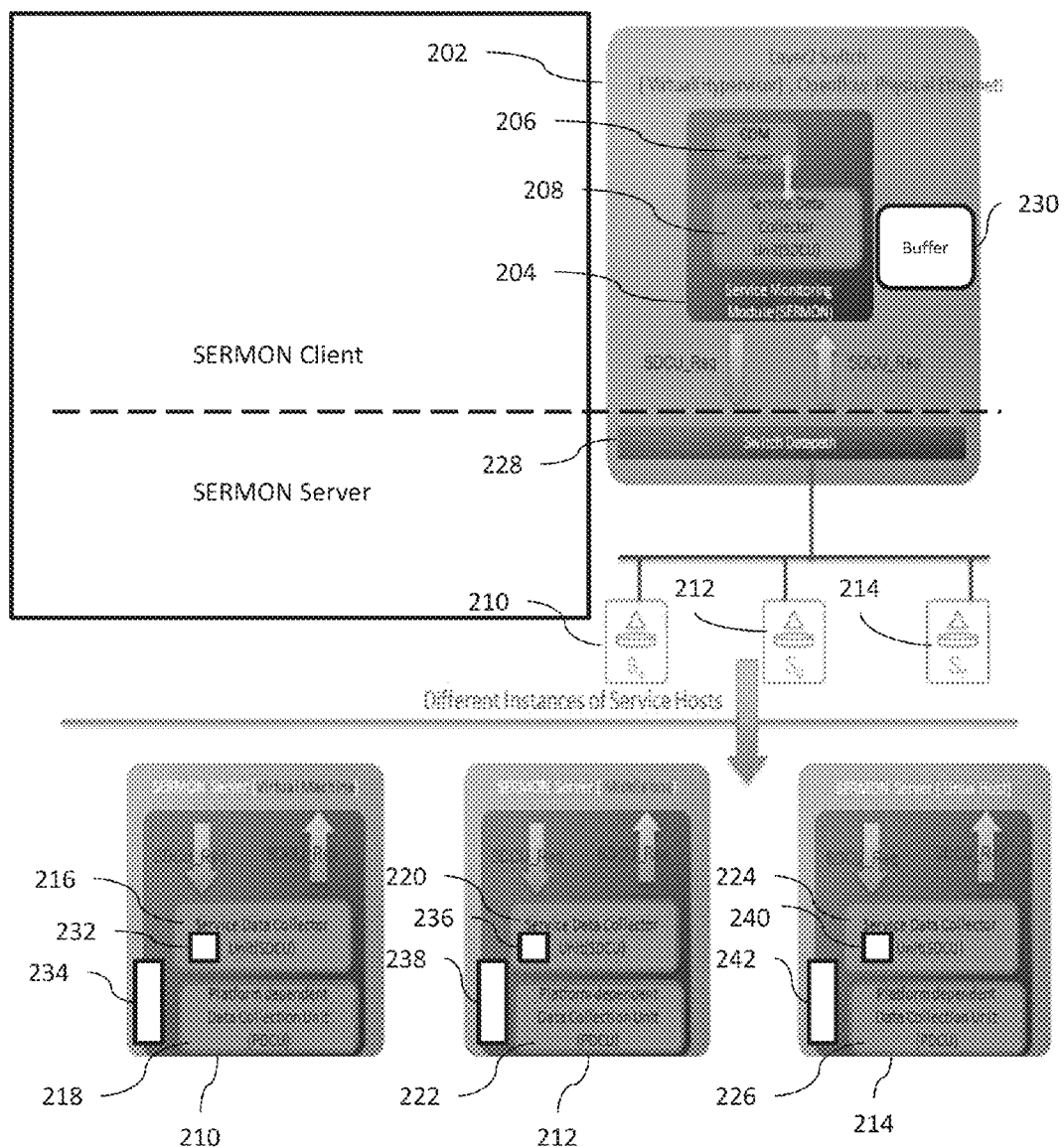
FIG. 2 illustrates a block diagram of a service monitoring (SERMON) client and SERMON server architecture, according to one embodiment.

FIG. 2 illustrates a block diagram of a SERMON client and SERMON server architecture according to one embodiment. The SERMON client module 204 and SERMON server 210, 212, 214 can be implemented in different environments as shown in FIG. 2. The Layer2 switch 202, e.g., running SERMON client 204, could either be an OpenFlow switch, a virtual switch (vSwitch) in a Hypervisor, or a Physical Ethernet switch. The SERMON client 204 is implemented as a software module that encapsulates the request appropriately (with a VLAN or a MPLS tag) request to be sent onward to the SERMON server 210, 212, 214. The SERMON client 204 also implements a RESTful server component to enable communication with the PDM 102. The SERMON client 204 includes a COM server 206 and a Service Data Collector Unit (SDCU) 208. The SERMON client 204 sends SDCU requests to service host(s), e.g., SERMON server 210, 212, 214, over switch datapath 228. Likewise, SERMON client 204 also receives SDCU responses over switch datapath 228.

The SERMON server 210, 212, 214 itself can be located inside a Virtual machine running on top of Hypervisor (SERMON server 210), running on a Linux Host without a Hypervisor (SERMON server 214), or on a physical middle box that hosts the server (SERMON server 212). Each SERMON server 210, 212, 214 includes a SDCU 216, 220, 224 and a Platform Dependent Collection Unit (PDCU) 218, 222, 226. The tagging mechanism should be chosen so as to mate the client with the server.

The SDCU is implemented as a thread, e.g., a kernel same-page merging (KSM) thread (ksmThread). The SDCU receives notifications from the SERMON module. The SDCU is responsible for encapsulation/decapsulation of requests/responses. The SDCU fetches the network monitoring parameters from the PDCU and returns the reply, e.g., response.

Network Controller

Network applications running on the centralized controller periodically request the PDM for SERMON metrics. The applications specify which layer2 switch and service host ID on which services are hosted. The applications specify the metrics in which they are interested. In one embodiment, the applications can determine metrics for current values or a snapshot of aggregated values over time. The network application(s) receive a reply from the PDM with the requested data.

In one embodiment, the data values are applied on application specific heuristics. In one embodiment, changes can be made to data plane switches. In this embodiment, the controller sends a new set of flow messages to the switches to alter the traffic going through the services hosted on, for example, one or more of the virtual machines.

Performance Database Manager (PDM)

The database 104 contains the information that is used by the controller applications 114, 116, 118. The PDM should be implemented in a highly available, reliable and scalable manner.

Each physical server, e.g., a physical service host or physical switch, notifies the controller 112 when the following events happen:

Each SERMON client comes up with a SERMON CliID
SERMON Server comes up with a SERMON ServID
Applications are launched with an App ID.

When the PDM 102 is launched the PDM 102 queries the centralized controller 112 for a list of SERMON CliID, SERMON ServIDs and application ID's. The PDM 102 also periodically queries the centralized controller 112 for the latest snapshot of the SERMON CliIDs, SERMON ServIDs and App IDs.

There are multiple controller applications 114, 116, 118 that require performance data from each of the hosted services 132, 134, 136, 138, 140 and each controller application 114, 116, 118 can generate a schema file that can be sent to the data base manager 102, which in turn populates the data base 104 based on the schema. It is important to note that there is no change to the hosted service 132, 134, 136, 138, 140. The database manager 102 has a per-application state that maintains a copy of the schema. Based on the schema, the database manager 102 queries the appropriate entity, e.g., the hosted service, for data with a specific SERMON CliID, SERMON ServID and AppID combination.

The PDM 102 has three important building blocks:

The PDM State Manager 106 is responsible for managing all of the states for metrics that are periodically collected from the entity identified by CliID/ServID/AppID that runs in the context of the hosted service environment. The PDM State Manager 106 stores these states in an application specific database 104 maintained by the PDM State Manager 106. The PDM State Manager is also responsible for formulating messages received from the centralized controller 112 through the COM server 110 and funneling the formulated messages to the COM client 108.

The COM server 110 is responsible for parsing messages received from the centralized controller 112 and sending these parsed messages to the PDM state manager 106. COM server 110 also prepares messages to be send to the controller 112, after the PDM 102 receives a response from the appropriate entities.

The COM client 108 is responsible for communications between the PDM 102 and the SERMON clients 124, 126, 128, 130. COM client 108 sends and receives performance specific requests/responses to/from the SERMON client. COM client 108 forwards requests from the PDM to the SERMON client(s). Likewise, COM client 108 passes responses received from the SERMON client(s) on to the PDM.

SERMON Client

The SERMON client module 124, 126, 128, 130, 204, identified by a SERMON CliID, is resident in the switch 144, 146, 148, 150, 202 and responds to the queries sent by the database manager 102.

The SERMON client 204 handles requests from the COM client 108. The SERMON client checks whether the inquiry is related to a particular instance or all instances of a hosted service 132, 134, 136, 138, 140, 210, 212, 214. The SERMON client then parses the request and stores this request as requested information. The SERMON client sends an internal message to the Service Data Collector Unit (SDCU) 208. The SDCU contacts the appropriate SERMON ServID/AppID entity 132, 134, 136, 138, 140, 210, 212, 214 for information.

The SERMON client sends a request message, e.g., a retrieve command, to the SERMON server(s) in order to request performance data. The SDCU formats a retrieve command, encapsulates the retrieve command into an appropriate tagged frame (VLAN, MPLS, TCP connection) and forwards the encapsulated retrieve command toward its destination. This tagging mechanism depends on the configuration.

The SERMON client handles response messages from SERMON Servers. The SERMON client waits for a response from the SERMON server. The SERMON client checks for any errors in the received response(s). When errors are detected, the error information is accumulated in a buffer along with the SerVID/AppID. When no errors are detected, the response is stored in a buffer 230 associated with the SERMON client, along with the ServID/AppID and the received counter, e.g., SERMON data category, value.

Buffering, in this context, is the process of receiving requests and storing them. Later, the responses are received by the COM client when the responses are returned from the SERMON servers. The COM client makes a note of the request and matches the request up with the received response.

The SERMON client sends the buffered response(s) to the PDM COM client 108. The SERMON CliID is filled at the beginning of the buffer. The response message is sent back to the PDM 102 that requested this information.

SERMON Server

The SERMON server 132, 134, 136, 138, 140, 210, 212, 214 handles the request, e.g., the request generated by SDCU 208, from the SERMON Client 202. The datapath 228 decapsulates the request and strips the tagged header. Datapath 228 passes the packet to the SDCU block 216, 220, 224, which parses the packet to look for an AppID. The SDCU 216, 220, 224 parses the packet, for example, using a packet buffer 232, 236, 240.

The SDCU 216, 220, 224 sends a request to PDCU unit 218, 222, 226. The PDCU unit implements the platform dependent way of collecting performance data. In one embodiment the performance data is collected using a kernel thread that searches the requested information in the kernel data structure(s) and returns the data, e.g., to the SDCU 216, 220, 224 from PDCU 218, 222, 226. If the PDCU cannot identify the data to be retrieved, the PDCU returns an error. The kernel thread can be used to construct a buffer in shared memory 234, 238, 242.

The SERMON server sends a response to the SERMON Client. The response message includes the data returned from the PDCU. The response message is encapsulated, e.g., by datapath 228 and returned to the requestor to be put into the database. The request from the client is satisfied by querying the database.

Traffic Steering Use Case

In order to improve the performance and security of their networks, network operators today deploy a wide range of specialized appliances or middle-boxes. An architecture based on SDN principles is used to explicitly steer different types of traffic through the desired set of middle-boxes. Using an architecture of this type provides an architecture that is easier to manage and provides greater scale, even at the granularity levels of per-subscriber and per-application defined policies.

Figure 3:
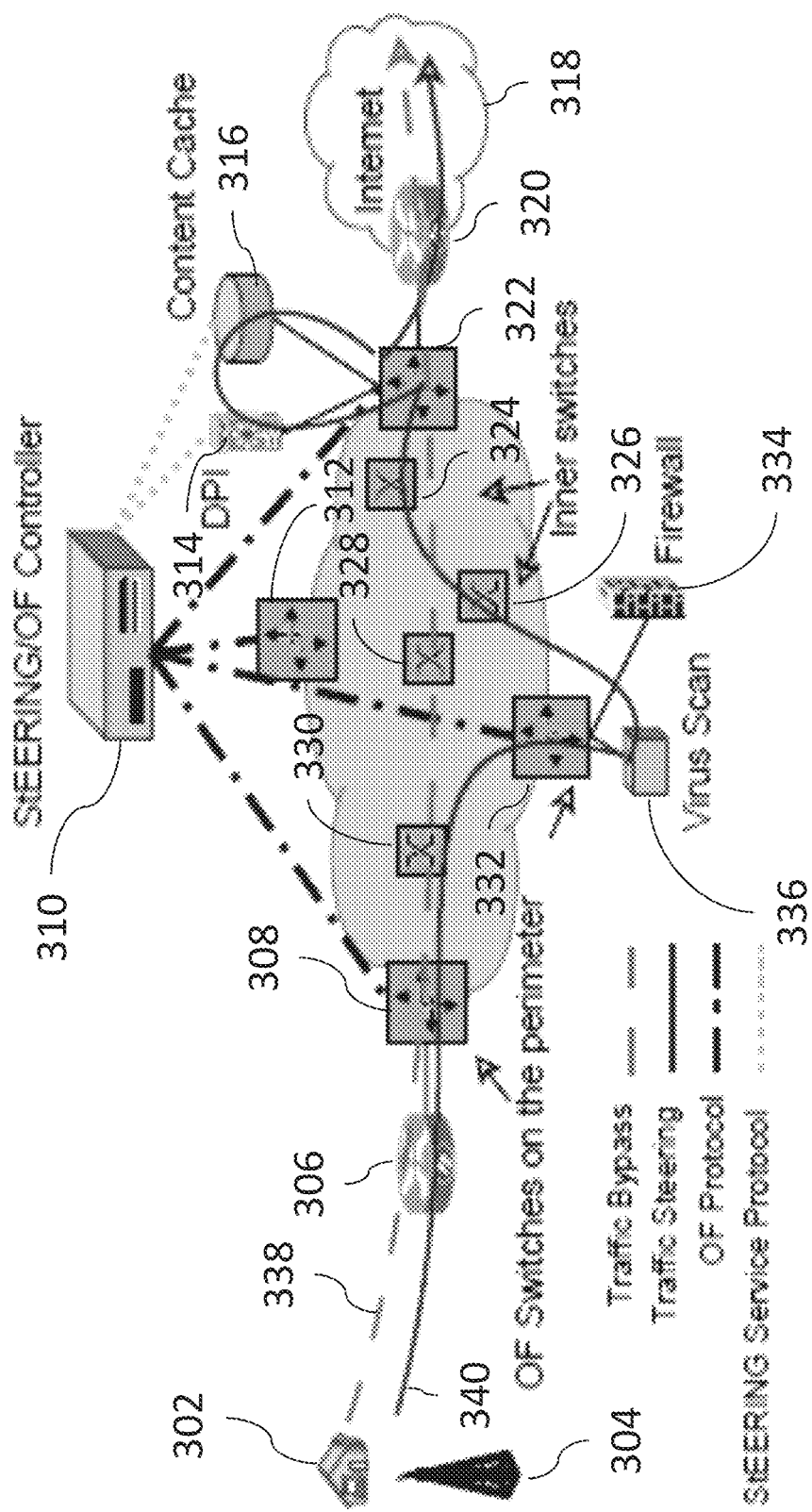
FIG. 3 illustrates a system for implementing software defined networking (SDN) inline services and forwarding, according to one embodiment.

FIG. 3 illustrates an example system for implementing SDN inline services and forwarding. Services 314, 316, 334, 336 are provided to subscribers 302, 304 using a plurality of perimeter switches 306, 312, 322, 332 and inner switches 324, 326, 328, 330. A logically centralized controller 112, 310 is used to manage switches and middleboxes, e.g., services. In one embodiment, the logically centralized controller 112, 310 is an Open Flow-based controller. In FIG. 3, two different service paths are shown. Service paths are set based on the subscriber, the application, and the required service order. Service paths are unidirectional, that is, different service paths are specified for upstream and downstream traffic. Service path 340 shows upstream traffic through Virus Scan 336, Deep Packet Inspection (DPI) 314 and Content Cache 316 before entering Internet 318 through perimeter switch 320. Service path 338 bypasses all of the services.

SDN inline services and forwarding architecture uses two different types of switches. The Perimeter Open Flow (OF) Switches 306, 312, 322, 332 are placed on the perimeter of the service delivery network. These switches classify the incoming traffic and steer this traffic towards the next service in the chain. OF switches 306, 312, 322, 332 are the switches to which services or gateway nodes are connected. The Inner Switches 324, 326, 328, 330 forward the traffic using efficient Layer 2 (L2) switching. Inner switches 324, 326, 328, 330 are only connected to other switches. Inner switches 324, 326, 328, 330 may or may not be OF switches.

Traffic steering is a two-step process. The first step classifies incoming packets and assigns them a service path based on predefined subscriber, application, and ordering policies. The second step forwards packets to a next service based on its current position along its assigned service path. This two-step traffic steering process only needs to be performed once between any two border routers, regardless of the number of switches that connects them.

For the different types of middle-box functionality, the set of parameters that could be used to construct efficient heuristics for the sole purpose of steering the traffic to the correct chosen instance of the service is identified.

Figure 4:
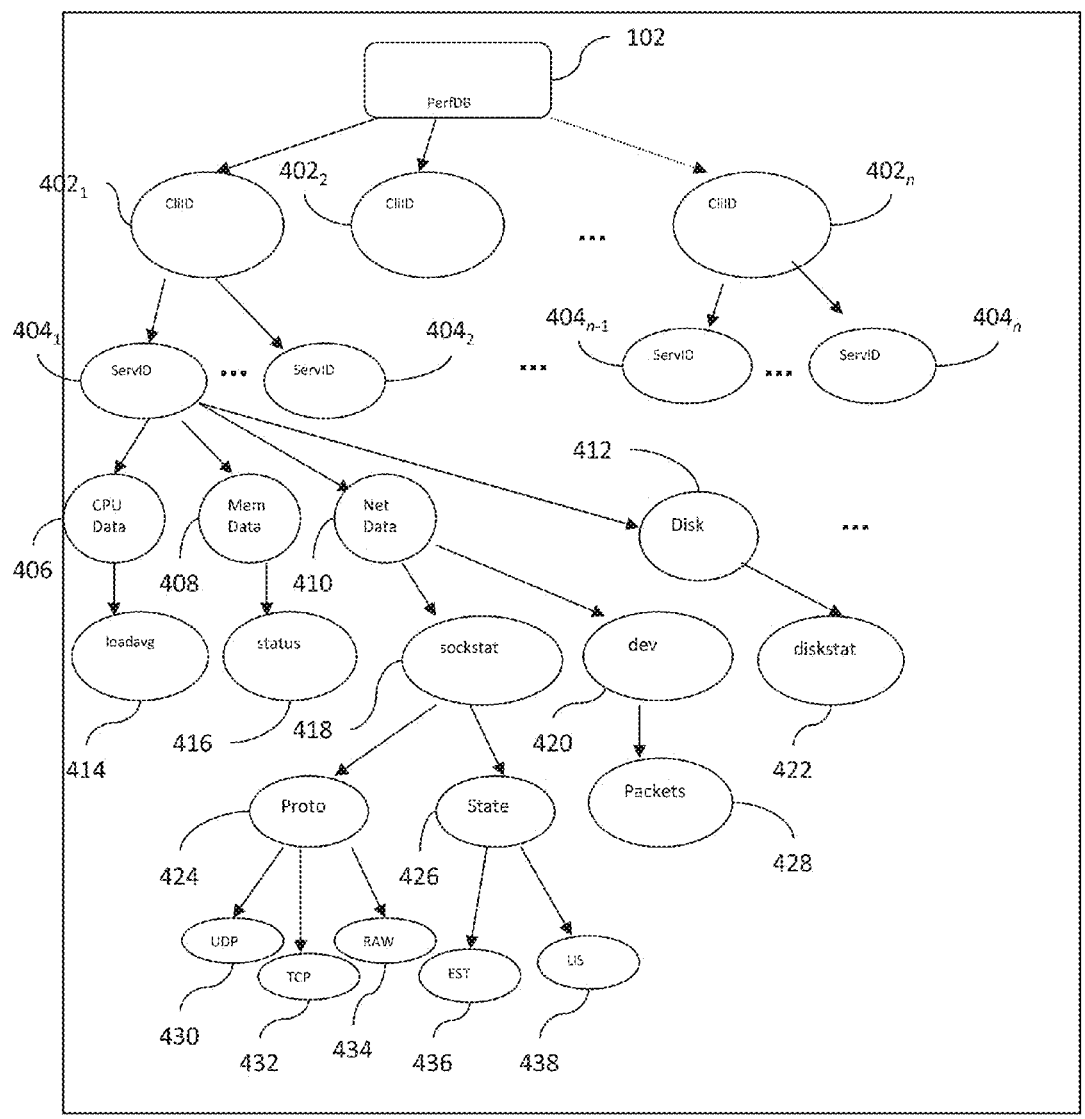
FIG. 4 illustrates a hierarchical relationship of performance data, according to one embodiment.

FIG. 4 illustrates hierarchy 400, which shows the hierarchical relationship of performance data according to one embodiment. The SERMON CliID $402_1, 402_2, \ldots, 402_n$ and ServID $404_1, 404_2, \ldots, 404_n$ are the SERMON Client and Server universally unique identifiers (UUIDs), respectively. Each child node represents a category of performance data that can be classified into CPU 406, Memory 408, net data 410, and disk data 412. CPU data 406 may include load average (loadavg 414) data. Memory data 408 may include status data 416. Net data 410 may include socket statistics (sockstat 418) data and device (dev 420) data. Dev 420 data may also include packet statistics data 428. Sockstat 418 data may also include protocol (proto 424) and status (state 426) information. Protocol information 424 may include statistics regarding User Datagram Protocol (UDP) data 430, Transmission Control Protocol (TCP) data 432, and raw packets, e.g., Internet Protocol (IP) packets without any protocol-specific transport layer formatting. State data 426 may include EST data 436 from a established session or LIS data 438 from a listening port. The leaf nodes in the hierarchy 400 show file names found in the standard Linux file system that contain the data that can be used to form an application heuristic. The data described in FIG. 4 has a hierarchical relationship. The /proc file system in Linux is one such example. However, even the proc file system in Linux does not have the layout as described in hierarchy 400. As such, the hierarchical relationship 400 can be applied to other file systems that are capable of representing hierarchical relationships.

A controller application driving the distribution of flows to the different instances of DPI, for example, could use the CPU data 406, e.g., CPU 1-min load, packet data 428, e.g., the packet rate statistics, and sockstat data 418, e.g., the number of open sockets. The DPI inspects each and every packet beyond the TCP headers scanning for recognizable content to apply rules and, therefore, the DPI instance processing the least amount of packets can be chosen to accept the flow. If there is more than an instance processing an equal number of packets CPU load could be used, for example, as a tie breaker. Similarly, the number of open sockets could be used as a tiebreaker as well.

Table 1 shows the different applications and the categories of performance data used by each of them, according to one embodiment. Each cell in the table shows the exact file name from FIG. 4 for each category which contains appropriate data to be used by the applications themselves. Instances of service names can be shown in the table to give an overall view of the performance data of a specific application.

TABLE 1

The Services and the Performance Categories they use

| Service Name | Metric | | | | |
|---|---|---|---|---|---|
| | CPU | Memory | Packets | Sockets | Disk |
| CF(Content Filter) | loadavg | status (Resident Set Size) | | | |
| FW(Firewall) | loadavg | | dev(Per proc pkt stats) | sockstat | |
| DPI(Deep Pkt Inspection) | loadavg | | dev(Per proc pkt stats) | sockstat | |
| Spam Filter | | | | | diskstat |
| Virus Scan | loadavg | status | | | dlskstat |
| NAT | loadavg | status | dev | | |

In one embodiment, an application queries the database for all existing SERMON client/SERMON Server entities and App ID's that are returned by the PDM. The application pushes the schema, e.g., sends a request to the PDM, in order to retrieve performance information pertinent to the application. This performance information can be collected for one or more instances of the application running on one or more entities, e.g., one or more service hosts. The application receives a response from the PDM and if performance data for a plurality of instances of the application is desired an algorithm is run to choose the next application instance to which a performance data flow is to be scheduled.

The Performance Database manager receives the request and validates the request against the schema it has for the application instance. The PDM then returns the values for the requested data items from its database. It is the responsibility of the PDM to query the specified data items from the SERMON Severs via the SERMON Clients on a periodic basis driven by the timing requirements specified by the application.

The SERMON Client receives independent requests for performance data. The server converts these requests into a retrieve command and forwards the retrieve command to the appropriate SERMON Server(s).

The SERMON Server receives the message, de-capsulates it and sends it to the kernel thread that searches and retrieves the requested information which is then returned to the requesting SERMON client.

The DPI application, for example, in one embodiment, executes the following steps:

a. The DPI application queries the database for all existing SERMON client/SERMON Server entities and DPI App ID's, which are returned by the database manager b. Push the schema to retrieve the 1-min CPU loadavg, the number of input and output packets (on the virtual interface that the virtual service is connected to) and the number of TCP sockets.

c. The application then requests the database for the information from all Service VM's that are interesting to this application, e.g., DPI, typically all DPI instances or specific DPI instances d. The application receives the response from the database and runs an algorithm to choose the next DPI instance to which to schedule a flow.

The Performance Database manager receives the request and validates the request against the schema that the PDM has for DPI. The PDM then returns the values for the requested data items from its database. It is the responsibility of the PDM to query the specified data items from the SERMON Severs via the SERMON Clients on a periodic basis driven by the timing requirements specified by DPI.

The SERMON Client receives independent requests for CPU load average, the total packet count and the number of open sockets. The server converts these requests into a retrieve command and forwards the retrieve command to the appropriate SERMON Server(s).

The SERMON Server receives the message, de-capsulates it and sends it to the kernel thread that searches and retrieves the requested information, e.g., DPI performance data, which is then returned to the requesting SERMON client.

TABLE 2

Per-interface statistics that can be correlated to a service instance

| Metric | Virt. Interface | | | | |
|---|---|---|---|---|---|
| | VIF1 | VIF2 | VIF3 | VIF3 | VIF4 |
| Broadcast Pkts | dev | Dev | Dev | dev | dev |
| Out Bound Pkt Rates | dev | Dev | Dev | dev | dev |

Table 2 shows per-interface packet statistics, according to one embodiment. Each row in the table represents a specific kind of metric. This table can be used to monitor the network as a whole. The number of broadcast packets and packet rates can be used to determine the health of the interface(s) which could eventually be correlated to a service.

Various terminating services such as transparent content cache, video-transcoders, web proxy engines can benefit from measurements of the number of sockets in connected state, cpu load, and percentage of available memory, to name a few.

The utilization of an intrusion prevention system (IPS), an intrusion detection system (IDS), and/or firewalls can be modeled from the input-output packet/byte counters and central processing unit (CPU) load. Network address translation (NAT) steering on the other hand uses an added parameter of the percent of available memory. Persistent memory parameters like available storage capacity take an important role for mail filtering or spam prevention networks. Other counters for sockets in a non-connected state or rate of in-coming packets become a guiding light to trigger alarms for denial-of-service attacks in steering service networks. This framework offers an opportunity to design an appropriate heuristic to optimize the appropriate application objective.

Message Formats

Figure 5:
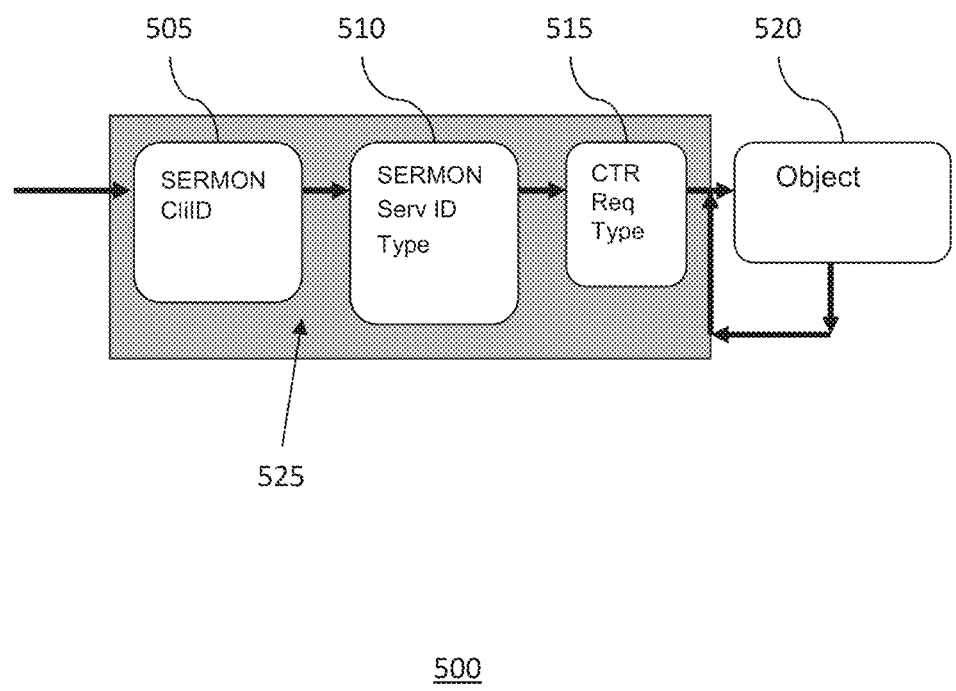
FIG. 5 illustrates a message format, according to one embodiment.

The message formats between the applications and the components of the framework are shown in FIGS. 5-10. FIG. 5 illustrates a message format 500 according to one embodiment. All messages carry the SERMON CliID 505 followed by the SERMON ServID type 510 and the counter type 515 which could signify "all" or "specific". Depending on the values of the ServID type 510 and Counter Request type 515, the objects 520 can be of different types. The shaded part 525 of message format 500 represents the required part of any message between the applications and components of the framework.

Messages can be made asynchronous by adding a transaction identifier. Each response can then embed this transaction identifier so that the transaction identifier can be correlated with a request. This mechanism can be used for multiple purposes like bulking or making the server responses asynchronous to the context of a request.

Performance Data Request

Figure 6:
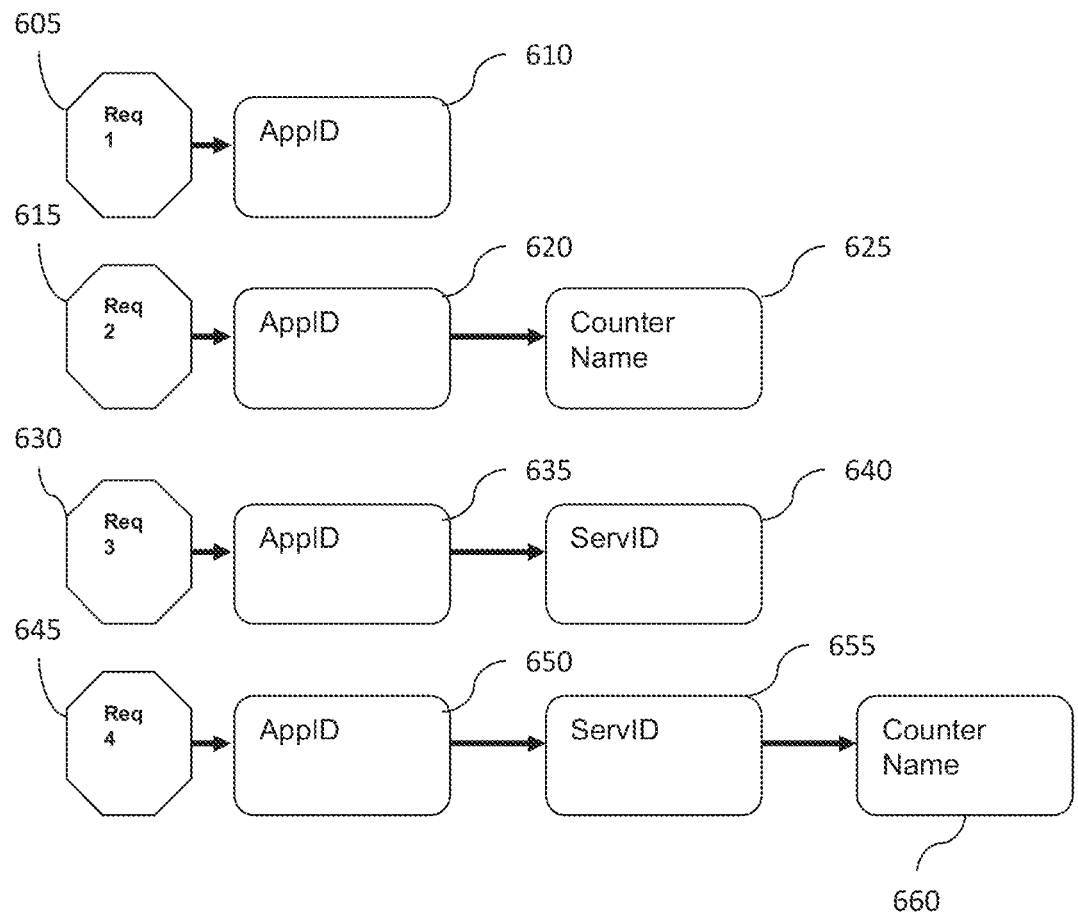
FIG. 6 illustrates the requests that can be sent by an application to the performance database manager (PDM).

A performance data request includes an application name, e.g., in the form of a UUID string, to identify the application. This UUID string may take the form of an AppID. All instances of a particular service can be identified by this application name string. The counter name object is included when a specific counter is being requested. A particular SERMON server instance is identified by the ServID. FIG. 6 shows all the requests that can be sent by the application to the PDM. Each request is denoted as such and each reply can be correlated with each request by using the request number.

Req1 605 includes an AppID 610. All instances of a particular service can be identified using the AppID. Using this request allows for performance data associated with the application across all SERMON servers to be requested using all pertinent counters.

Req2 615 includes an AppID 620 and a counter name 625. Using this request allows a specific counter to be requested across all SERMON servers.

Req3 630 includes an AppID 635 and a ServID 640. Using this request allows for application performance data using all pertinent counters to be requested for a particular SERMON server instance.

Req4 645 includes an AppID 650, a ServID 655, and a counter name 660. Using this request allows for performance data to be requested for a specific counter for a particular SERMON server instance.

Performance Data Reply

Figure 7:
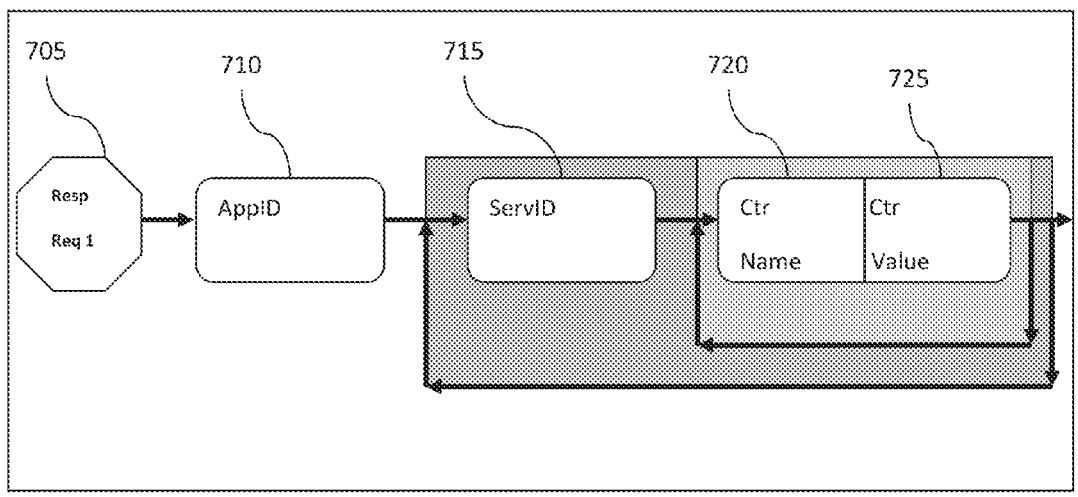
FIG. 7 illustrates a block diagram of a performance data reply message format, according to one embodiment.

FIG. 7 illustrates a block diagram of a performance data reply message format according to one embodiment. In this embodiment, a response 705 to Req1 605 returns performance data for a particular application 710 for all ServIDs 715 and all Counters 720. Each counter name 720 returns a particular counter value 725 in the response.

Figure 8:
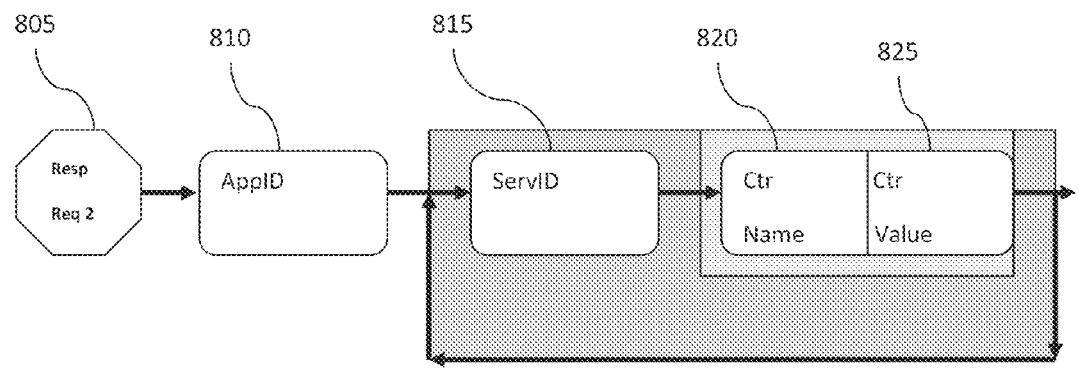
FIG. 8 illustrates a block diagram of a performance data reply message format, according to one embodiment.

FIG. 8 illustrates a block diagram of a performance data reply message format according to one embodiment. In this embodiment, a response 805 to Req2 615 returns performance data for a particular application 810 for all ServIDs 815 and a specific counter 820. Each counter name 820 returns a particular counter value 825 in the response.

Figure 9:
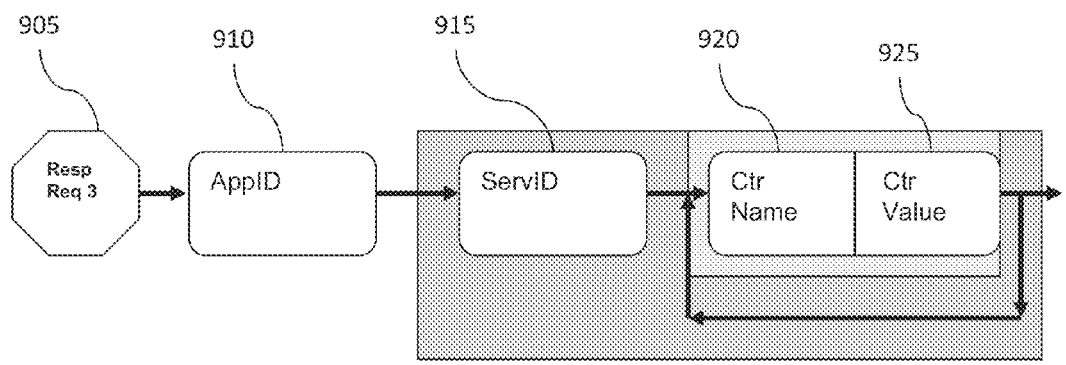
FIG. 9 illustrates a block diagram of a performance data reply message format, according to one embodiment.

FIG. 9 illustrates a block diagram of a performance data reply message format according to one embodiment. In this embodiment, a response 905 to Req3 630 returns performance data for a particular application 910 for all counters 920 of a particular ServID 915. Each counter name 920 returns a particular counter value 925 in the response.

Figure 10:
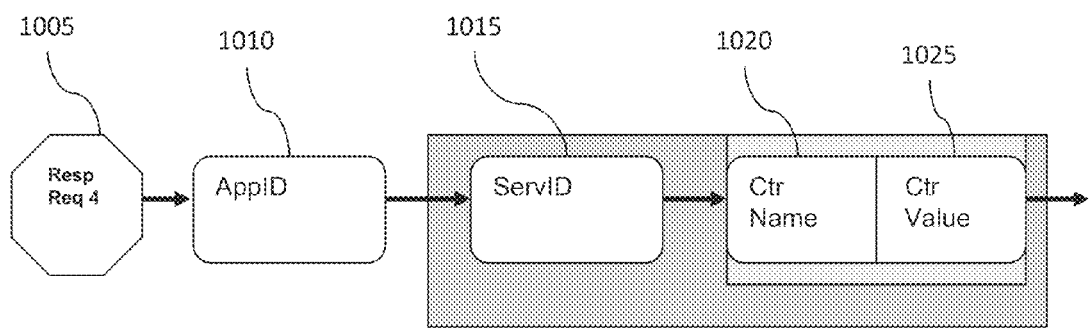
FIG. 10 illustrates a block diagram of a performance data reply message format, according to one embodiment.

FIG. 10 illustrates a block diagram of a performance data reply message format according to one embodiment. In this embodiment, a response 1005 to Req4 645 returns performance data for a particular application 1010 for a specific ServID 1015 and a specific Counter 1020. The counter name 1020 returns a particular counter value 1025 in the response.

The integer part of the value in the counter objects in the responses of FIGS. 7, 8, 9, and 10 can have up to 128 digits and the fractional part of the number can be up to nine digits. The application name itself can be described with a 128 byte string. The ServID is a UUID, which, in one embodiment, is a sixteen byte hexadecimal string.

Each one of the responses in FIGS. 7, 8, 9, and 10 can have an error object that replaces the counter value field in the counter object. The error string can be one of the following:

1—Invalid Counter Requested
2—Malformed Request
3—Retry Request
4—Request authorization failure Database Manager and SERMON Client Messaging In one embodiment, the database manager and the SERMON Client is capable of exchanging request messages.

A request, e.g. Req1 605, for all counters from all service instances of a particular application can be implemented using the following command: GET http://api.perfdata.com/<version>/CliID/AppID/allService/allCounter/.

A request, e.g., Req3 630, for all counters from a specific service instance of an application can be implemented using the following command:

GET http://api.perfdata.com/<version>/CliID/AppID/ServID/allCounter.

A request, e.g., Req2 615, for all application instances, Service VMs, for a specific counter can be implemented using the following command:

GET http://api.perfdata.com/<version>/CliID/AppID/allService?counter="counter-name".

A request, e.g., Req4 645, of a specific instance of an application for a specific counter can be implemented using the following command:

GET http://api.perfdata.com/<version>/CliID/AppID/ServID?counter="counter-name".

The responses to these queries are returned in standard XML, JSON or any other chosen format. The data in the replies is organized as shown in FIGS. 7, 8, 9, and 10.

The following standard http errors are returned to the above requests:

1. OK. No Error
2. Bad request
3. Internal Error
4. Retry request

SERMON Client and SERMON Server Messaging

This messaging happens via a configured tagging mechanism such as VLAN tags or MPLS tags. The particular tagging mechanism or format should be one that can be recognized by all incarnations of the hosted services. The message is encapsulated in a tagged frame and forwarded to its destination.

These requests are sent to the appropriate SERMON Servers located in the different hosted environments, identified by ServID and the application identifier, AppID, in the request uniform resource identifier (URI). The SERMON server iterates through all the counters for all AppIDs and for each counter, the SERMON server parses the name, looks up the name, and returns the value or an error corresponding to the request. The SERMON server should set the number of counter objects field appropriately to enable the hosted service instance to iterate through every requested object.

FIG. 11 shows a request/response format for a counter according to one embodiment. Initially, the server in the hypervisor fills in the number of counter objects, sets the command to fetch and fills the names of the counter fields in the counter object. The SERMON server also sets the counter value field and the error code field to zero.

The second step in the process of collecting the data is to notify the service VM instance that a request has been sent.

For each of the counters specified in the shared memory the service VM instance parses the counter name, looks through its resources (typically the proc file system) for the specified counter, and returns the value in the counter value field described above.

Appropriate error codes are returned in the error codes field. These error codes may include the following:

0—No error
1—Busy, Retry
2—Counter Name Not Found

Figure 12:
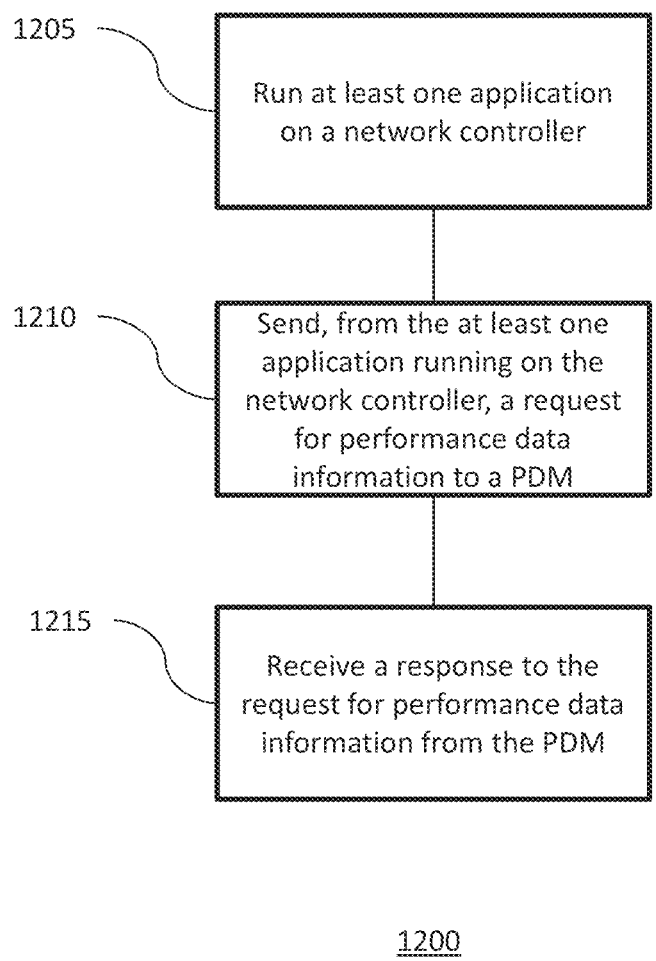
FIG. 12 illustrates a block diagram of a method for providing network performance monitoring according, to one embodiment.

FIG. 12 illustrates a block diagram of a method 1200 for providing network performance monitoring according to one embodiment. At block 1205, at least one application is run on a network controller. The applications running on the network controller include, but are not limited to, a content filter, a firewall, deep packet inspection (DPI), a spam filter, a virus scan, and network address translation (NAT).

At block 1210, a request for performance data information, e.g., SERMON data/metrics, is sent to a PDM. The request includes the application name, which can be a UUID such as an AppID. In one embodiment, all instances of a particular service can be identified by the application name.

Network applications running on the centralized controller periodically request the PDM for SERMON metrics. The applications specify which layer2 switch and service host ID on which services are hosted. The applications specify the metrics in which they are interested. In one embodiment, the applications can determine metrics for current values or a snapshot of aggregated values over time.

In one embodiment, the performance data associated with the at least one application can be requested across all service monitoring (SERMON) servers using all pertinent counters. In one embodiment, the performance data associated with the at least one application is requested across all service monitoring (SERMON) servers using a specific counter. In one embodiment, the performance data associated with the at least one application is requested across a specific service monitoring (SERMON) server using all pertinent counters. In one embodiment, the performance data associated with the at least one application is requested across a specific service monitoring (SERMON) server using a specific counter.

At block 1215, a response to the request for performance data information is received. The network application(s) receive a reply from the PDM with the requested data.

Figure 13:
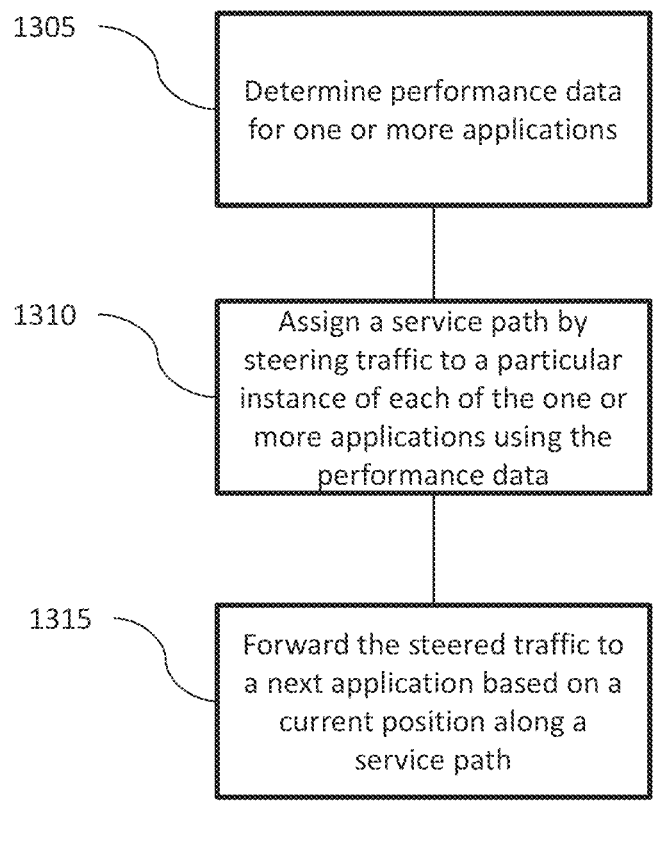
FIG. 13 illustrates a block diagram of a method for determining a service path using network performance monitoring data, according to one embodiment.

FIG. 13 illustrates a block diagram of a method 1300 for determining a service path using network performance monitoring data, according to one embodiment. At block 1305, performance data is determined for one or more applications.

At block 1310, a service path is assigned by steering traffic to a particular instance of each of the one or more applications using the performance data. In one embodiment, the performance data is applied to application specific heuristics. In one embodiment, changes can be made to data plane switches. In this embodiment, the controller sends a new set of flow messages to the switches to alter the traffic going through the services hosted on, for example, one or more of the virtual machines. At block 1315, the steered traffic is forwarded to a next application based on a current position along a service path.

Figure 14:
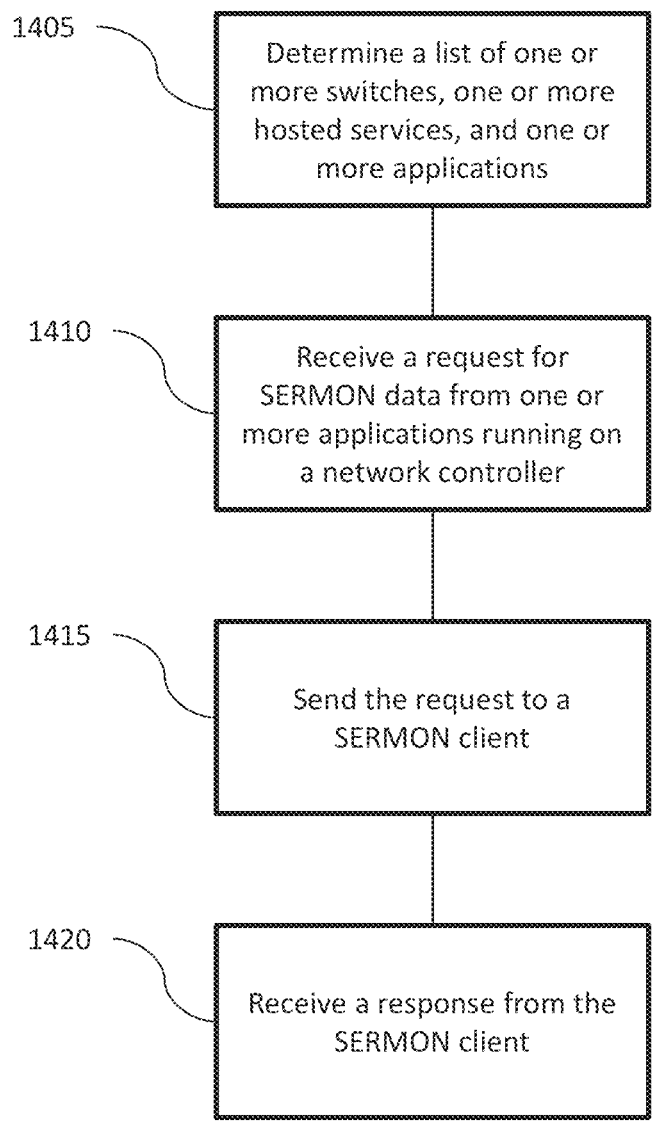
FIG. 14 illustrates a block diagram of a method for providing network performance monitoring using a PDM, according to one embodiment.

FIG. 14 illustrates a block diagram of a method 1400 for providing network performance monitoring using a PDM, according to one embodiment. At block 1405, a list of one or more switches, one or more hosted services, and one or more applications is determined. On boot up, the PDM receives from the network controller a list of switches, the hosted services of each switch, and applications of each switch. The PDM periodically queries the network controller for a list of active switches, Service Hosts, and applications. The PDM stores and updates the list on the AppDB. In one embodiment, the one or more switches are Layer2 switches.

At block 1410, a request for SERMON data is received from one or more applications running on a network controller. A COM server of the PDM parses the request and sends the request to a PDM state manager.

At block 1415, the request is sent to a SERMON client, e.g., running on a switch. At block 1420, a response is received from the SERMON client.

In one embodiment, the request is a snapshot request. If the snapshot request is made for the first time, the AppID of the application is flagged for information retrieval. Otherwise, the PDM state manager fetches the values related to the snapshot request previously stored in the AppDB.

In one embodiment, the PDM state manager formulates request messages for every pertinent metric. Request messages are sent to each switch hosting the services using a COM client. A response is sent to the application on the network controller that requested the SERMON data once a reply, e.g., response, message has been received from the switch.

In one embodiment, when a flag has been set for an AppID, the PDM makes a request for SERMON metrics through the COM client. The PDM stores an application specific aggregated SERMON metric in the AppDB. When a retrieval flag is set for an AppID, a response is sent to the application on the controller once a reply is received from the switch.

Figure 15:
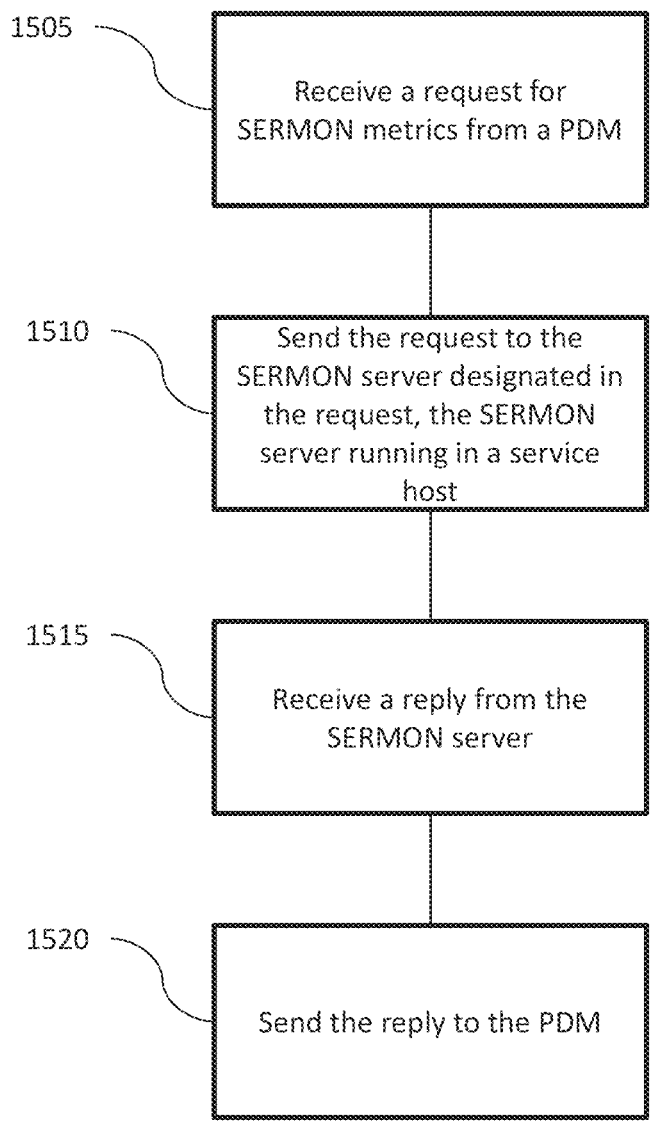
FIG. 15 illustrates a block diagram of a method for providing network performance monitoring using a SERMON client, according to one embodiment.

FIG. 15 illustrates a block diagram of a method 1500 for providing network performance monitoring using a SERMON client, according to one embodiment. The SERMON client running in the switch registers itself using an ID, e.g., a ServID, with the network controller on bootup. The SERMON client also notifies a controller of the service host(s) and application(s) hosted on the service host(s) using an ID, e.g., the ServID. At block 1505, a request for SERMON metrics is received from the PDM. A COM server of the SERMON client parses the request and send the request to a SDCU.

At block 1510, the request is sent to the SERMON server designated in the request. The SERMON server runs in a service host. In one embodiment, the SDCU retrieves the service host to which the request needs to be sent. For each host, the SDCU formulates a command and an expected data type, encapsulates the request in a designated tag, sends the encapsulated request, e.g., frame, to a switch datapath, and waits for a reply, e.g., response, from the service host.

At block 1515, a reply is received from the SERMON server. In one embodiment, the SDCU reads the reply. The SDCU parses the buffer and formulates a message for the COM server of the SERMON client by decapsulating the tagged frame. The SDCU sends a reply message to COM server of the SERMON client. At block 1520, the COM server send a reply to the PDM.

Figure 16:
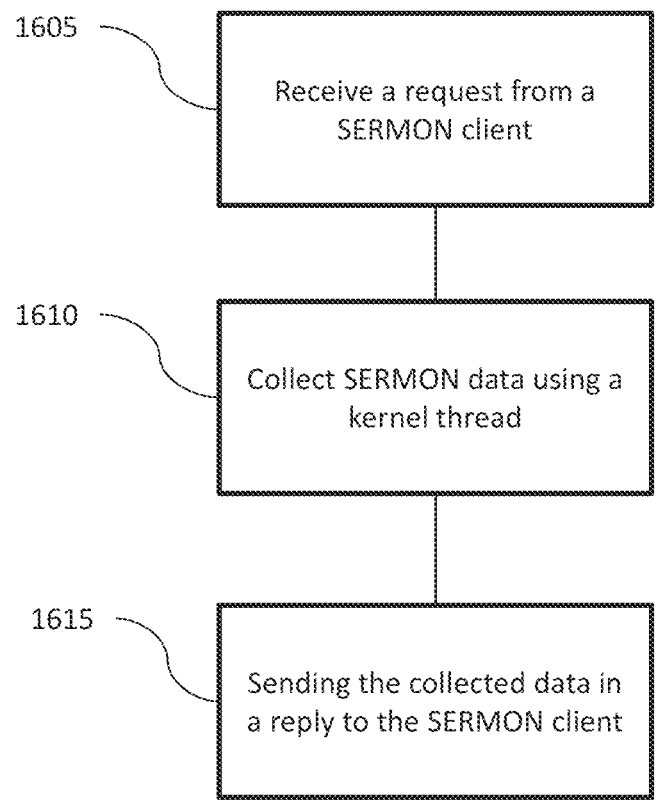
FIG. 16 illustrates a block diagram of a method for providing network performance monitoring using a SERMON server, according to one embodiment.

FIG. 16 illustrates a block diagram of a method 1600 for providing network performance monitoring using a SERMON server, according to one embodiment. At block 1605, a request is received at the SERMON server from a SERMON client. The SERMON server is running in a service host. The service host has a SDCU server block used to collect data. The SDCU is implemented as a thread, e.g., a ksmthread. The SDCU receives notifications, e.g., requests, sent to the SERMON server. The SDCU decapsulates the tagged frame, e.g., received from the SERMON client and parses the packet buffer.

At block 1610, the SERMON data is collected using a kernel thread. The ksmthread fetches SERMON data from local kernel data structures. The ksmthread constructs a buffer in the shared memory and sends the notification, e.g., reply/response, to the SERMON server by encapsulating the notification as a tagged frame. In one embodiment, the ksmthread is implemented in a Platform dependent Data Collection Unit (PDCU). At block 1615, the collected data is sent in the notification to the SERMON client.

Figure 17:
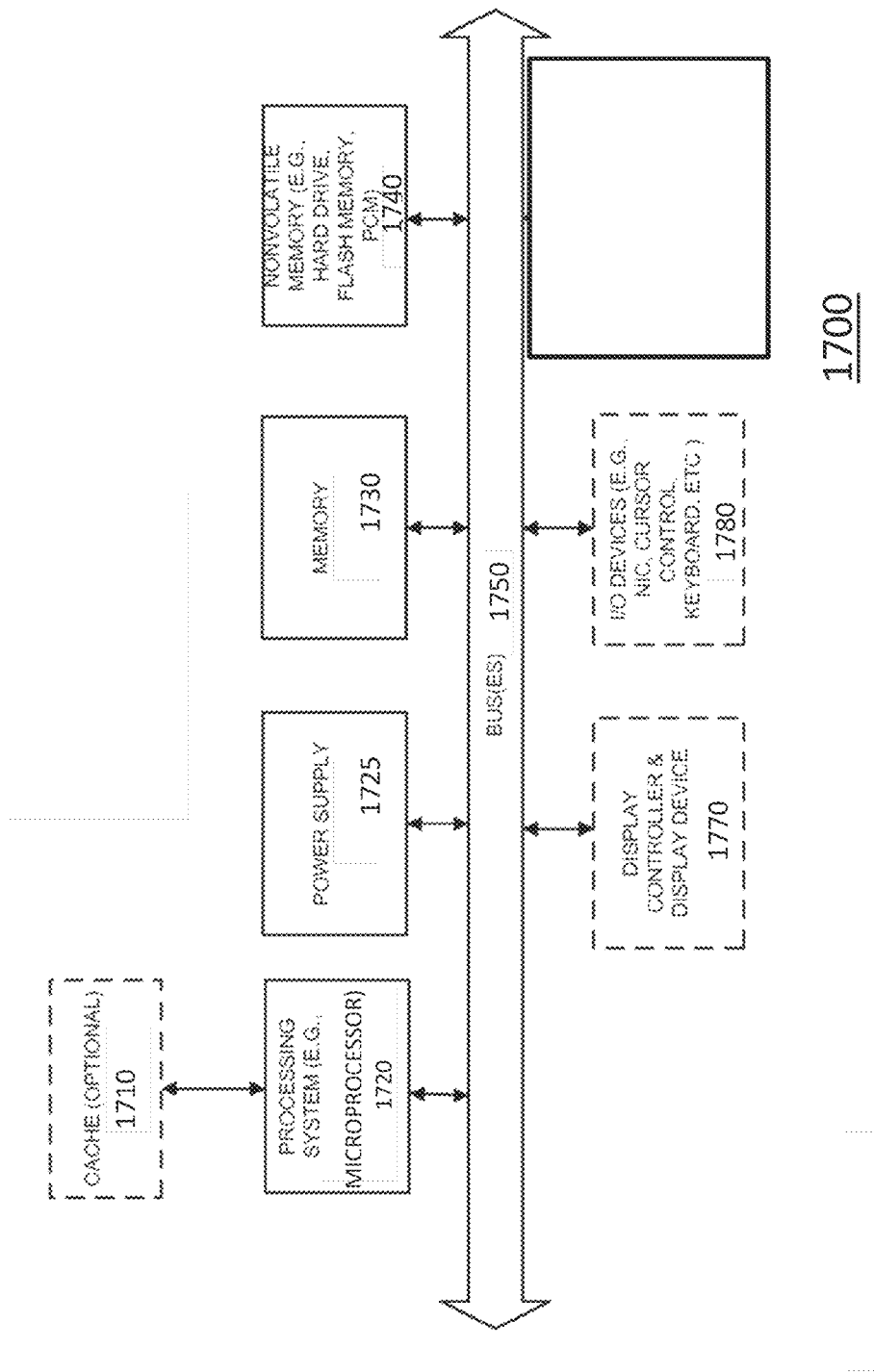
FIG. 17 illustrates a block diagram of an exemplary computer system, according to one embodiment.

FIG. 17 illustrates a block diagram of an exemplary computer system according to embodiments of the invention. The exemplary computer system 1700 in FIG. 17 can be used to implement controller 112, PDM 102, SERMON client 124, 126, 128, 130, and/or SERMON server 132, 134, 136, 138, 140. Those skilled in the art would recognize that other computer systems used to implement this device may have more or less components and may be used in the disclosed embodiments.

The computer system 1700 includes a bus(es) 1750 that is coupled with a processing system 1715, a power supply 1720, volatile memory 1725 (e.g., double data rate random access memory (DDR-RAM), single data rate (SDR) RAM), nonvolatile memory 1730 (e.g., hard drive, flash memory, Phase-Change Memory (PCM). The processing system 1715 may be further coupled to a processing system cache 1710. The processing system 1715 may retrieve instruction(s) from the volatile memory 1725 and/or the nonvolatile memory 1730, and execute the instruction to perform operations described above. The bus(es) 1750 couples the above components together and further couples a display controller 1770, one or more input/output devices 1780 (e.g., a network interface card, a cursor control (e.g., a mouse, trackball, touchscreen, touchpad, etc.), a keyboard, etc.). In one embodiment, the display controller 1770 is further coupled to a display device 1775.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more buses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

The present invention allows advanced heuristics to be applied based on the performance and configuration information which is made available to the application. This framework has the following characteristics:

1. It is scalable—The number of connections increases proportional to the number of machines (or the number of layer2 switches); the framework only connects with switches. A single switch typically can be connected to multiple appliances.
2. It is extendable—The framework can be extended to provide new performance statistics to allow new applications to be deployed. These applications can be agile and dependent on subscriber load thereby providing cost effective service deployments.
3. It is non-intrusive—Applications need not be compiled with special libraries or do not need to be reprogrammed to take advantage of the framework. Applications are completely unaware of the performance statistics being gathered.
4. It works seamlessly in both virtualized and non-virtualized chassis-like clustered or data-centre centric environments.
5. The SERMON module can be easily integrated with "healthd" for the smart services router (SSR) to provide important performance related information for a variety of applications—service aware support node (SASN), border gateway function (BGF), border network gateway (BNG), evolved packet gateway (EPG), etc. The "healthd" on the SSR monitors the general health of the system in terms of the functionality of the components, responsiveness of the components and the quality of the connections between the components, etc. In this context, SERMON provides the necessary performance information that relates to the functionality and quality. If the functionality stops working, the performance numbers can indicate this, for example, by showing a very low transfer rate and a high rate of error.

While the invention has been described in terms of several embodiments, those skilled in the art will recognize that the invention is not limited to the embodiments described. The description is thus to be regarded as illustrative instead of limiting.

What is claimed is:

1. A method for providing network performance monitoring, comprising:
   receiving, by a switch running a SERMON client in a network and further comprising a communications (COM) server and a Service Data Collector Unit (SDCU),
   a request for SERMON metrics from a performance database manager (PDM);
   parsing, by the SERMON client, the request and sending the request to a Service Data Collector Unit (SDCU) of the SERMON client;
   sending, by the SERMON client, the request to a SERMON server designated in the request, the SERMON server running in a service host;
   receiving, by the SERMON client, a reply from the SERMON server; and
   sending, by the SERMON client, the reply to the PDM, wherein SERMON data in the reply is the basis for steering traffic in the network, wherein for each request sent to each service host, the SDCU:
formulates a command and an expected data type;
encapsulates the request in a designated tag;
sends the encapsulated request to a switch datapath; and
waits for a reply from the service host.

2. The method of claim 1, wherein receiving the reply from the SERMON server comprises the SDCU receiving the reply and sending the reply to the COM server.

3. The method of claim 2, wherein the COM server sends the reply to the PDM.

4. An apparatus for providing network performance monitoring, comprising:
an electronic device including a set of one or more processors coupled to one or more non-transitory machine-readable storage media, wherein the electronic device includes a switch comprising a service monitoring (SERMON) client, the SERMON client comprising a communications (COM) server and a Service Data Collector Unit (SDCU);
the SERMON client configured to:
receive a request for SERMON metrics from a performance database manager (PDM);
parse the request and send the request to the SDCU;
send the request to the SERMON server designated in the request, the SERMON server running in a service host;
receive a reply from the SERMON server; and
send the reply to the PDM, wherein SERMON data in the reply is the basis for steering traffic in the network, wherein for each request sent to each service host, the SDCU:
formulates a command and an expected data type;
encapsulates the request in a designated tag;
sends the encapsulated request to a switch datapath; and
waits for a reply from the service host.

5. The apparatus of claim 4, wherein the SDCU receives the reply and sends the reply to the COM server.

6. The apparatus of claim 5, wherein the COM server sends the reply to the PDM.

* * * * *